United States Patent
Zheng (10) Patent No.: US 8,121,770 B2
(45) Date of Patent: Feb. 21, 2012

(54) BOUNDARY ADAPTATION SCHEME FOR SPOOL VALVE PRESSURE CONTROL

(75) Inventor: Yuhong Zheng, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 1235 days.

(21) Appl. No.: 11/825,211

(22) Filed: Jul. 5, 2007

(65) Prior Publication Data

US 2007/0276575 A1    Nov. 29, 2007

(51) Int. Cl.
    G06F 7/00    (2006.01)
    G05D 1/00    (2006.01)
(52) U.S. Cl. .............. 701/78; 477/127; 701/79; 303/167
(58) Field of Classification Search ............ 701/70, 701/78–79; 303/166, 121, 113.1, 167, 113; 477/127
    See application file for complete search history.

(56) References Cited

U.S. PATENT DOCUMENTS

| | | | |
|---|---|---|---|
| 5,157,992 A * | 10/1992 | Hayashi et al. ............ | 477/40 |
| 5,403,245 A * | 4/1995 | Watanabe et al. ............ | 477/54 |
| 5,545,929 A | 8/1996 | Fijioka et al. | |
| 5,560,688 A | 10/1996 | Schappler et al. | |
| 5,636,910 A | 6/1997 | Kost et al. | |
| 5,669,678 A | 9/1997 | Stumpe et al. | |
| 5,727,854 A | 3/1998 | Pueschel et al. | |
| 5,782,541 A | 7/1998 | Schappler | |
| 5,806,938 A | 9/1998 | Stumpe et al. | |
| 5,816,978 A * | 10/1998 | Tabata et al. ............ | 477/156 |
| 5,904,335 A | 5/1999 | Oyama | |
| 5,941,608 A | 8/1999 | Campau et al. | |
| 5,980,420 A * | 11/1999 | Sakamoto et al. ............ | 476/10 |
| 5,980,426 A * | 11/1999 | Kamada et al. ............ | 477/143 |
| 6,030,055 A | 2/2000 | Schubert | |
| 6,086,167 A | 7/2000 | Heckmann et al. | |
| 6,086,513 A * | 7/2000 | Tominaga ............ | 477/169 |

(Continued)

FOREIGN PATENT DOCUMENTS

| | | |
|---|---|---|
| DE | 36 36 140 A1 | 4/1988 |
| DE | 38 33 881 A1 | 4/1990 |
| DE | 19654769 A1 | 7/1998 |

(Continued)

OTHER PUBLICATIONS

Analytic superposition computation method of ring throttle slice deformation on non-uniform pressure; Changcheng Zhou; Shaofang Mao; Leilei Zhao; Automation and Logistics (ICAL), 2010 IEEE International Conference on Digital Object Identifier: 10.1109/ICAL.2010.5585277; Publication Year: 2010 , pp. 193-196.*

(Continued)

Primary Examiner — Cuong H Nguyen
(74) Attorney, Agent, or Firm — MacMillan, Sobanski & Todd, LLC (57) ABSTRACT

A method for adapting a closing boundary for a proportional spool valve includes generating or detecting a pressure command signal. Next a pressure error is obtained by subtracting an actual wheel brake pressure from its pressure command. Then a modified pressure error is calculated a modified pressure error is calculated in such a way that steady state pressure errors resulting from mismatched feedforward term, control deadzone and other factors are subtracted from measured pressure error to leave the only error to be that due to boundary deviation. An estimator is then used to estimate an apply boundary deviation or a release boundary deviation of the spool valve, as appropriate. A boundary table is updated using the resultant boundary deviation estimate.

25 Claims, 8 Drawing Sheets

U.S. PATENT DOCUMENTS

| | | | |
|---|---|---|---|
| 6,161,907 | A | 12/2000 | Luckevich et al. |
| 6,226,586 | B1 | 5/2001 | Luckevich et al. |
| 6,364,429 | B1 | 4/2002 | Roden et al. |
| 6,456,921 | B1 | 9/2002 | Bodie et al. |
| 6,634,722 | B1 * | 10/2003 | Zheng et al. ............... 303/113.1 |
| 6,692,088 | B1 * | 2/2004 | Zheng ........................ 303/113.1 |
| 6,736,465 | B2 * | 5/2004 | Inoue ......................... 303/119.1 |
| 6,851,762 | B2 * | 2/2005 | Kamiya et al. ............. 303/113.3 |
| 7,136,736 | B2 * | 11/2006 | Kuragaki et al. ............... 701/70 |
| 2002/0035012 | A1 * | 3/2002 | Murasugi et al. ............... 477/86 |
| 2002/0101114 | A1 * | 8/2002 | Kamiya et al. ............. 303/114.1 |
| 2003/0111900 | A1 * | 6/2003 | Inoue ........................... 303/166 |
| 2004/0084959 | A1 * | 5/2004 | Kusano ...................... 303/119.2 |
| 2004/0138802 | A1 * | 7/2004 | Kuragaki et al. ............... 701/70 |
| 2004/0186648 | A1 * | 9/2004 | Zheng et al. ................... 701/70 |
| 2007/0276575 | A1 * | 11/2007 | Zheng ............................ 701/78 |

FOREIGN PATENT DOCUMENTS

| | | |
|---|---|---|
| DE | 199 36 269 A1 | 2/2001 |
| EP | 0 233 360 A2 | 8/1987 |
| EP | 0875431 A1 | 11/1998 |
| JP | 09166103 A * | 6/1997 |
| JP | 11105687 A * | 4/1999 |
| JP | 2001-384517 * | 12/2001 |
| JP | 3593401 B2 * | 11/2004 |
| WO | WO 02/26540 A1 | 4/2002 |

OTHER PUBLICATIONS

Study on Virtual Measurement of Flow Rate Characteristics of Discharge Solenoid Valve; Yang Lihong; Zhou Hua; Digital Manufacturing and Automation (ICDMA), 2010 International Conference on; vol. 2 ; Digital Object Identifier: 10.1109/ICDMA.2010.465; Publication Year: 2010 , pp. 581-584.*

Development of a 7-function hydraulic underwater manipulator system; Jianjun Yao; Liquan Wang; Peng Jia; Zhuo Wang; Mechatronics and Automation, 2009. ICMA 2009. International Conference on; Digital Object Identifier: 10.1109/ICMA.2009.5246489; Publication Year: 2009 , pp. 1202-1206.*

The simulation model and dynamic performance for pressure control cartridge valve based on AMESim; Wang Qiao-yi; Zhu Yao; Huang Hai-jun; Gong Zhong-liang; Consumer Electronics, Communications and Networks (CECNet), 2011 International Conference on; Digital Object Identifier: 10.1109/CECNET.2011.5769027; Publication Year: 2011 , pp. 2788-2.*

Road adaptive active suspension design using linear parameter-varying gain-scheduling; Fialho, I.; Balas, G.J.; Control Systems Technology, IEEE Transactions on; vol. 10 , Issue: 1; Digital Object Identifier: 10.1109/87.974337 Publication Year: 2002 , pp. 43-54.*

Research of Hydraulic Pressure Suspension Technology of Half-axle Structure and Multi-axle Special Vehicle; Wang Xinyu; Zhao Jingyi; Information Engineering (ICIE), 2010 WASE International Conference on; vol. 2; Digital Object Identifier: 10.1109/ICIE.2010.152; Publication Year: 2010 , pp. 240-243.*

SAE Technical Paper #950762, Intelligent Braking for Current and Future Vehicles, Donald Schenk, et al.

SAE Technical Paper #960991, Electrohydraulic Brake System—The First Approach to Brake-By-Wire Technology, Wolf-Dieter Jonner, et al.

* cited by examiner

BOUNDARY ADAPTATION SCHEME FOR SPOOL VALVE PRESSURE CONTROL

BACKGROUND OF THE INVENTION

This invention relates in general to spool valve control and, in particular, to a self-adaptation scheme for spool valves in an electrohydraulic brake system. Spool valves can be used in electrohydraulic brake systems to control the pressure of brake fluid applied to vehicle wheel brakes.

Traditionally, proportional spool valves are operated in a manner proportional to the voltage applied to the valve's controlling solenoid. The spools within a spool valve moves against a spring force to a position proportional to the voltage applied. As the spool moves within a bore in the spool valve body, lands on the spool (typically) allow or prevent fluid communication between different ports formed in the spool valve body, thereby permitting or preventing flow through various fluid conduits connected to the ports. The operation of, for example, a three-way spool valve is well known in the art, and need not be further discussed here. However, as it relates to this invention, the spool valves either allow or prevent hydraulic fluid flow in a hydraulic circuit, for example, in a hydraulic circuit of a vehicle brake system.

An electrohydraulic braking (EHB) system utilizes electronically controlled valves, pumps, or a combination thereof to augment, replace, or control the base braking operation of a vehicle brake system. Base braking, sometimes referred to as foundation braking, is the basic braking called for by the operator of a vehicle. In base braking, the brake pedal operates a master cylinder, causing the master cylinder to send pressurized hydraulic brake fluid to the wheel brakes of a vehicle. Advanced braking systems, such as EHB systems, have been used to improve the performance of vehicle braking systems by augmenting or replacing the base braking function with other braking operations.

One of the first of many advanced braking functions that has been developed for vehicles was an Antilock Braking System (ABS), which typically involves the operation of valves and pumps to selectively release and re-apply brakes during a braking operation. While typical base braking is commanded by the operator, ABS braking controls the vehicle brakes to recover from and limit skidding of a vehicle's wheels due to braking the wheels harder than permitted by the available coefficient of friction of the road surface. Since pumps and valves are electronically controlled to augment the base braking operation, a vehicle equipped with ABS may generally be said to have an EHB system.

Another advanced braking function that may be accomplished by a properly configured EHB system is VSC (Vehicle Stability Control), which is a system for selectively actuating vehicle brakes to improve the stability of a vehicle during vehicle maneuvers. Other braking applications producing a pressure command input to the present invention include DRP (Dynamic Rear Proportioning—a system for controlling the front to rear proportioning of a vehicle braking command), TC (Traction Control—which typically involves selective application of brakes during vehicle acceleration to recover from and limit skidding of a vehicle's wheels due to accelerating the wheels faster than permitted by the available coefficient of friction of the road surface), ACC (Autonomous Cruise Control—a cruise control system that can actuate vehicle brakes to maintain proper vehicle spacing relative to a vehicle in front) and similar functions.

A subset of electrohydraulic braking systems is electronic brake management (EBM). EHB systems can allow braking to be primarily controlled by the vehicle driver with a conventional master cylinder system. Additionally, an electronically controlled portion of the system operates the brakes under certain conditions, i.e. anti-lock, traction control, etc. In Electronic Brake Management systems, primary braking is controlled electronically. In an EBM system, the vehicle driver or a safety system generates an electronic signal, which in turn operates the pumps and valves to achieve a braking pressure within the system. A pedal simulator creates the effect for the driver of applying braking pressure to the brakes, while actually brake pressure at the brakes is actually created by pumps under electronic control. Such systems typically also provide a back-up braking system in case of a failure of the primary system. Frequently, the back-up system includes a master cylinder manually operated by the driver to provide the hydraulic pressure that actuates the brakes during the failure event.

Regardless of the type of electrohydraulic braking system that is used, a system with proportional spool valves has a control process that controls whether the spool valves are closed, opened to particular flow paths, or intermediately positioned to permit throttled flow through particular flow paths. In order for a control system to properly control the spool valves, it must be configured to account for the forces acting on the valves, the natural characteristics of the valves and be able respond to changes in the valve during braking operations.

As discussed above, proportional spool valves used in the above-described systems typically comprise a valve armature in the form of a spool having lands and grooves defined thereon, an outer sleeve within which the spool moves, with various ports formed in the outer sleeve that are closed off by the lands of the spool or connected together by the grooves of the spool during relative movement of the spool. Proportional spool valves also typically comprise a spring which urges the spool toward a rest position. If an electric current controls the valve, there generally is a solenoid that generates a magnetic field causing the valve armature to be moved from the rest position relative to the outer sleeve. Because a valve can be normally open or normally closed, there are different forces acting upon the valve in its default position. Generally, such forces can be a magnetic force, a spring force, an inlet pressure force, or an outlet pressure force. The inlet and outlet pressure forces will ordinarily vary depending upon the load demanded within the system. In that voltage is proportional to current, it is understood that the use of current controls are to be within the scope of the claims of the present invention.

To balance the forces that are naturally occurring on the valve, so that a particular valve is just opened to either a high pressure source or a reservoir, the closing boundaries must be determined. A closing boundary also compensates for deadband in the system.

Deadband compensation is compensation for spool valve overlap—the distance that the spool must move between the point at which the apply port is just closed and the point at which the release port is just closed, and further movement in the same direction will begin to open the release port. This deadband compensation is used to reduce delays in valve response to an applied voltage when the valve is in its normal position. In proportional spool valve pressure controls, a closing boundary is defined as the minimal (for normally open ports) or maximal (for normally closed ports) voltage required to move the spool to a position in which a land of the spool blocks fluid flow through a port of the sleeve. Closing boundary data, as used for deadband compensation, gives minimal ramp lags but is dependent on how accurately the closing boundary is set. Several factors make it difficult to accurately set the closing boundary under all operating conditions. First, it is difficult to accurately measure the closing boundary. Second, the actual closing boundary changes in a time-variant manner due to operating pressure, temperature and potentially other naturally occurring phenomena. Lastly, the actual boundary varies from one valve to another because of manufacturing tolerances.

In a three-way spool valve, there exist an apply closing boundary and a release closing boundary, both of which are needed in the pressure control to combat hysterisis in the hardware.

To exhibit ideal performance in a system, each valve would have to be trimmed individually to match the closing boundaries. This individualized tailoring process is time-consuming and expensive to conduct for a mass-produced system. Therefore, it is important to devise a boundary self-adaptation scheme to produce the system in a cost-effective manner.

U.S. Pat. No. 6,086,167 to Heckmann, et al. describes a method and device for regulating wheel brake pressure. Pressure is regulated by a regulator generating a driving signal quantity for a pressure-influencing valve arrangement on the basis of the active operating point of the valve arrangement. Given a pressure differential across the valve arrangement, the operating point can be determined from a predetermined current-pressure characteristic curve. The characteristic curve essentially defines a point (at or near zero flow) from which up or down hydraulic flow is utilized to regulate wheel brake pressure.

U.S. Pat. No. 6,030,055 to Schubert improves upon the quality of the pressure control system described in U.S. Pat. No. 6,086,167 and makes manual determination and adjustment of the characteristic curves unnecessary. Primarily, Schubert's invention is based upon the alternative exemplary embodiment of U.S. Pat. No. 6,086,167, where a regulator based on pressure difference between reference pressure and actual wheel brake pressure outputs a pressure correction quantity to the reference pressure, and the corrected reference pressure in turn is used to find activation current from the current-pressure characteristic curve. Schubert describes a process that automatically equalizes the correlation between the pressure difference at a valve and the activation current. The correction quantity occurring in the course of a regulation operation is held within defined limits by appropriate adaptation of the characteristic curves. The limits of the correction quantity are determined as a function of the actual wheel brake pressure and the dynamic ratio of the reference pressure. The characteristic curve for the apply valve is modified during pressure buildup and the characteristic curve for the release valve is modified during pressure reduction. It should be noted that both of the afore-mentioned patents deal with poppet valves.

An estimation approach that estimates boundary deviation should disregard performance changes due to other factors. A system that does disregard such other factors would be beneficial in achieving consistent and convergent estimation. Therefore, an estimation approach based on a different philosophy than that of the patents listed above would provide a more accurate response to a pressure command signal. Consistent estimation would in turn help generate consistent pressure control performance for different types of pressure commands.

One such approach is disclosed in my U.S. Pat. No. 6,692,088, which approach entailed adapting a closing boundary for a proportional poppet valve. More specifically, the approach entailed using the sign of the pressure command derivative over time to determine which one of the two estimators, each associated with a respective one of an apply poppet valve and a release poppet valve for a wheel brake in a vehicle hydraulic brake system (or other hydraulic system) should be updated. Next a modified pressure error is calculated in such a way that steady state pressure error, resulting from feedforward term mismatch, control deadzone, and other factors, is subtracted from measured pressure error. Finally, the modified pressure error is used as the input to the estimators and the boundary table is updated using the resultant boundary deviation estimates. However this approach is not obviously applicable to use in spool valves, due to differences in construction between poppet valves and spool valves.

SUMMARY OF THE INVENTION

This invention relates to a method for adapting apply and release closing boundaries for a proportional three-way spool valve, comprising implementing apply and release estimators to estimate boundary variations of the valve. As used in this disclosure, the term "three-way spool valve" should be interpreted as a spool valve or combination of valves including at least one spool valve which can be arranged and controlled to perform at least the function of a three-way spool valve, that is, to apply fluid pressure from a higher pressure source (such as a pump, a high pressure accumulator, etc.) to a load, and to release fluid pressure from the load to a lower pressure area (such as a reservoir, low pressure accumulator, etc.). Thus, for example, the invention also relates to a method for adapting an apply closing boundary for an apply spool valve, comprising implementing an apply estimator to estimate boundary variations of the apply spool valve. The invention further relates to a method for adapting a release closing boundary for a release spool valve, comprising implementing an release estimator to estimate boundary variations of the release spool valve.

Each of the method for adapting apply and release closing boundaries for the proportional three-way spool valve preferably entail using the sign of the pressure command derivative over time to determine which one of the two estimators for a wheel should be updated. Next a modified pressure error is calculated in such a way that steady state pressure error, resulting from feedforward term mismatch, control deadzone, and other factors, is subtracted from measured pressure error. Finally, the modified pressure error is used as the input to the estimators and the boundary table is updated using the resultant boundary deviation estimates.

The proposed boundary self-adaptation scheme implements two estimators, an apply estimator and a release estimator, that are used to estimate the opening and closing boundary variations of an associated three-way spool valve at each of several channels. Each channel can represent a wheel brake in a hydraulic brake circuit, for example. Indeed, while this invention is described in the context of the control of hydraulic loads in the form of vehicle wheel brakes, the invention can be applied to hydraulic or pneumatic systems other than vehicle braking systems, and the scope of the claims should be thus correspondingly broadly interpreted. The sign of the pressure command derivative over time is used to determine which estimator should be updated. When the pressure command derivative over time is positive, the apply estimator would be updated and the release estimator left unchanged. When the pressure command derivative over time is negative, the apply estimator is ignored and the release estimator is updated. A modified pressure error is calculated and is then used in the estimation. The steady state pressure error resulting from mismatched feedforward term, control deadzone and other factors are then subtracted from the measured pressure error. The only error that remains after completion of the above-described correction process, is the error due to boundary deviation. The boundary deviation error is then used to update the boundary table. The estimators can be determined in one of several ways, described briefly below:

A first method of determining the estimators, according to a preferred embodiment of the invention, is in a fast boundary auto-calibration scheme that includes a quasi-closed-loop pressure control system. The auto-calibration test is preferably set up so that the test only needs one cycle of pressure upward sweep and pressure downward sweep in order to cover the entire operating range of pressures for the three-way spool valve. Imaginary control signals are calculated under the assumption that the targeted pressure error is present within the self-calibration test. The actual control signals used with the self-calibration test and the imaginary control signals are then used to calculate the estimated boundaries in such a way that the targeted pressure error would result with estimated boundaries in place.

A second method for adapting the closing boundary for a proportional spool valve involves measuring an actual boundary value for the valve at a single first pressure, and then mapping application specific generic data onto the boundary value; that is, to apply a generic curve (estimation model) for the type of spool valve and specific anticipated service, and then estimating boundary values for the valve at a plurality of pressures, and storing the boundary values for each of said plurality of pressures in a memory device.

A third method for adapting the closing boundary for a proportional spool valve involves measuring actual boundary values for the valve at for a few pressures along a portion of the operating curve, and then extrapolating boundary deviation values associated with points on the rest of the operating curve based on the measured actual boundary deviations. Apply and release boundary tables are then updated using the measured and extrapolated boundary deviations.

Finally, a fourth method of determining the estimators that is contemplated is to determine and update the estimators periodically during operation of the hydraulic system, such as when a vehicle hydraulic brake system is operated while a vehicle is in use. In this embodiment, the proposed boundary automatic or self-calibration scheme implements two estimators including an integral element that are used to estimate the boundary variations of two valves at each of several channels. Each channel can represent a wheel brake in a hydraulic circuit. The sign of the pressure command derivative over time is used to determine which estimator should be updated. When the pressure command derivative over time is positive, the apply estimator would be updated and the release estimator left unchanged. When the pressure command derivative over time is negative, the apply estimator is ignored and the release estimator is updated. A modified pressure error is calculated and is then used in the estimation. The steady state pressure error resulting from mismatched feedforward term, control deadzone and other factors are then subtracted from the measured pressure error. The only error that remains after completion of the above-described correction process, is the error due to boundary deviation. The boundary deviation error is then used to update the boundary table. Gain scheduling is used in the estimators to deal with potential asymmetry in mapping from boundary deviation to modified pressure error. To avoid transients and integral wind-up, the estimators are updated during gentle braking maneuvers. Finally, the whole pressure region is partitioned into segments with one state variable associated with each segment. The values of state variables are in turn used in computing control commands at the corresponding segments. Note that it is preferred that this embodiment be implemented after the implementation one of the other above-described embodiments in order to initially calibrate the system (generate the generic curve/estimation model).

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
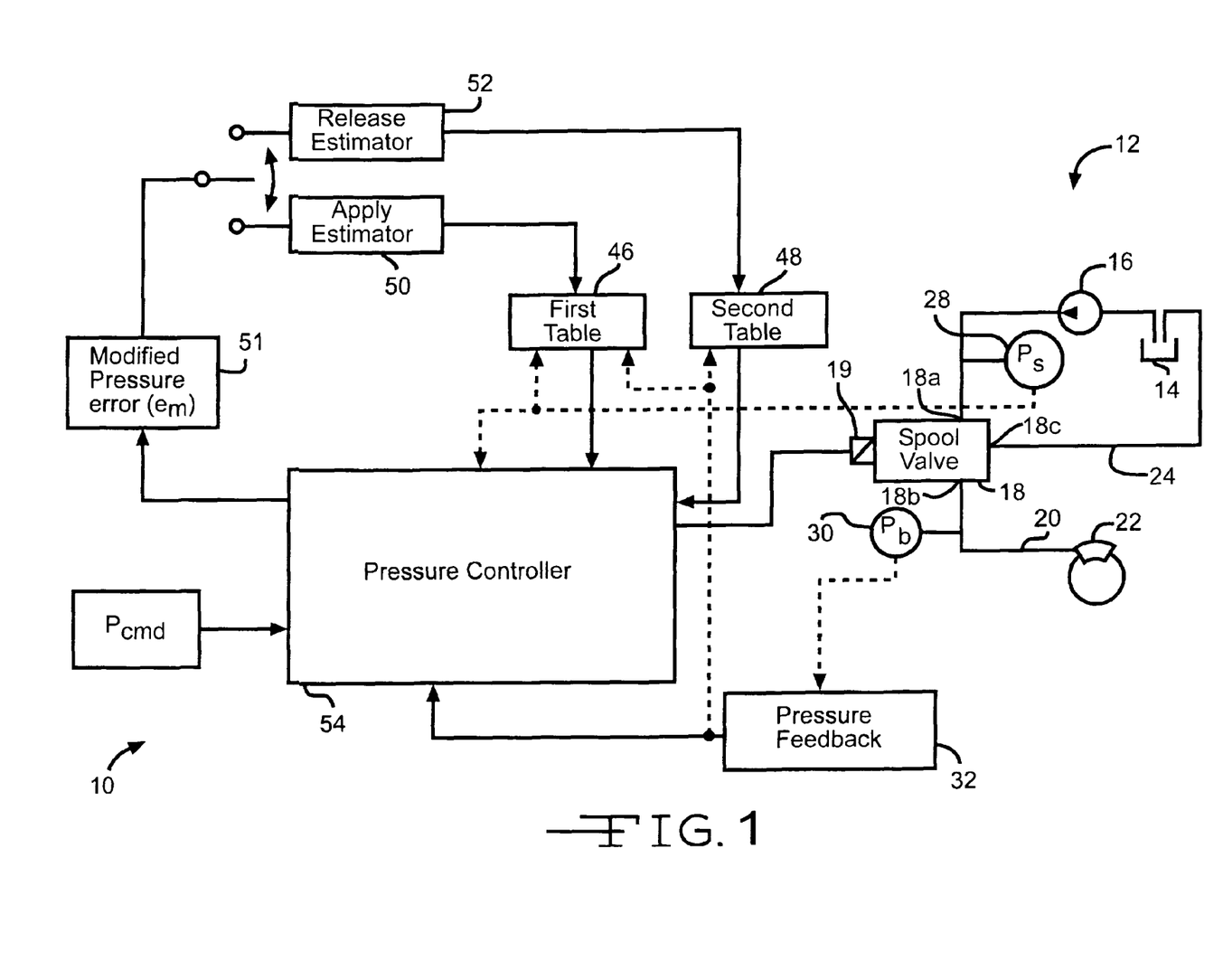
FIG. 1 is a simplified schematic view of a vehicle braking system including a portion of the system electronic controls and boundary adaptation controls therefore.

Referring now to the drawings, there is illustrated in FIG. 1 a portion 10 of electronic circuitry processing braking signals that implements a pressure control algorithm, and a greatly simplified schematic representation of a typical EHB braking system 12. The portion 10 of the electronic circuitry also an apply estimator 50 and a release estimator 52 of the present invention. The estimators 50, 52 can include an integral element.

The simplified EHB system 12 includes a fluid reservoir 14. A pump 16 pumps hydraulic brake fluid from the reservoir 14. The pump 16 (typically complemented by a high-pressure accumulator, not shown) supplies pressurized hydraulic brake fluid to an three-way spool valve 18, which is preferably implemented as a normally closed solenoid operated spool valve. When the three-way spool valve 18 is opened, pressurized hydraulic brake fluid passes from the pump 16 to an inlet port 18a of the three-way spool valve 18, through the three-way spool valve 18 to a load port 18b, and flows through a conduit 20 to a vehicle wheel brake 22. When the spool of the spool valve 18 is repositioned to block fluid flow between the inlet port 18a and the load port 18b, and to permit fluid flow between the load port 18b and a release port 18c, the three-way spool valve 18 can also release pressurized fluid from the wheel brake 22 to the reservoir 14 via a second fluid conduit 24.

The flow through the three-way spool valve 18 is controlled by the pressure controller 54 based on an input signal of the pressure commanded in the EHB braking system 12. A pressure command signal, $P_{cmd}$, can originate from a vehicle driver by a signal generated by an EHB system as described above, or from a signal generated by test/calibration equipment, as will be described below. The pressure command signal $P_{cmd}$ is then processed in the pressure controller 54 to output a signal necessary to obtain the demanded flow. Lookup table factors (voltage or current), represented by first boundary table 46 and second boundary table 48, are implemented in the pressure controller 54 to adjust the signal applied to the three-way spool valve 18 based on pre-existing forces on the valve. The look-up tables 46, 48 give the signal necessary to take the valve 18, to the appropriate (apply or release) just-closed position given the existing pressure. The apply just-closed position is the position the valve 18 is in when the spool of the valve 18 is moved to throttle and then stop flow through the spool valve 18 between the apply port 18a and the load port 18b. Note that either the apply port 18a or the load port 18b may remain in communication with the groove in the spool that provides communication between the apply port 18a and the load port 18b. Indeed, it may be the case that it is usually the load port 18b that is closed off while the apply port 18a remains in communication with the groove in the spool when the valve 18 is in the apply just-closed position. Similarly, the release just-closed position is the position that the valve 18 is in when the spool of the valve 18 is moved to throttle and then stop flow through the spool valve 18 between the load port 18b and the release port 18c. Note that either the release port 18c or the load port 18b may remain in communication with the groove in the spool that provides communication between the release port 18c and the load port 18b. Indeed, it may be the case that it is usually the load port 18b that is closed off while the release port 18c remains in communication with the groove in the spool when the valve 18 is in the release just-closed position.

The de-energized state for the three-way spool valve 18 is with the apply pathway between the apply port 18a and the load port 18b closed and the release pathway between the load port 18b and the release port 18c open.

Figure 2:
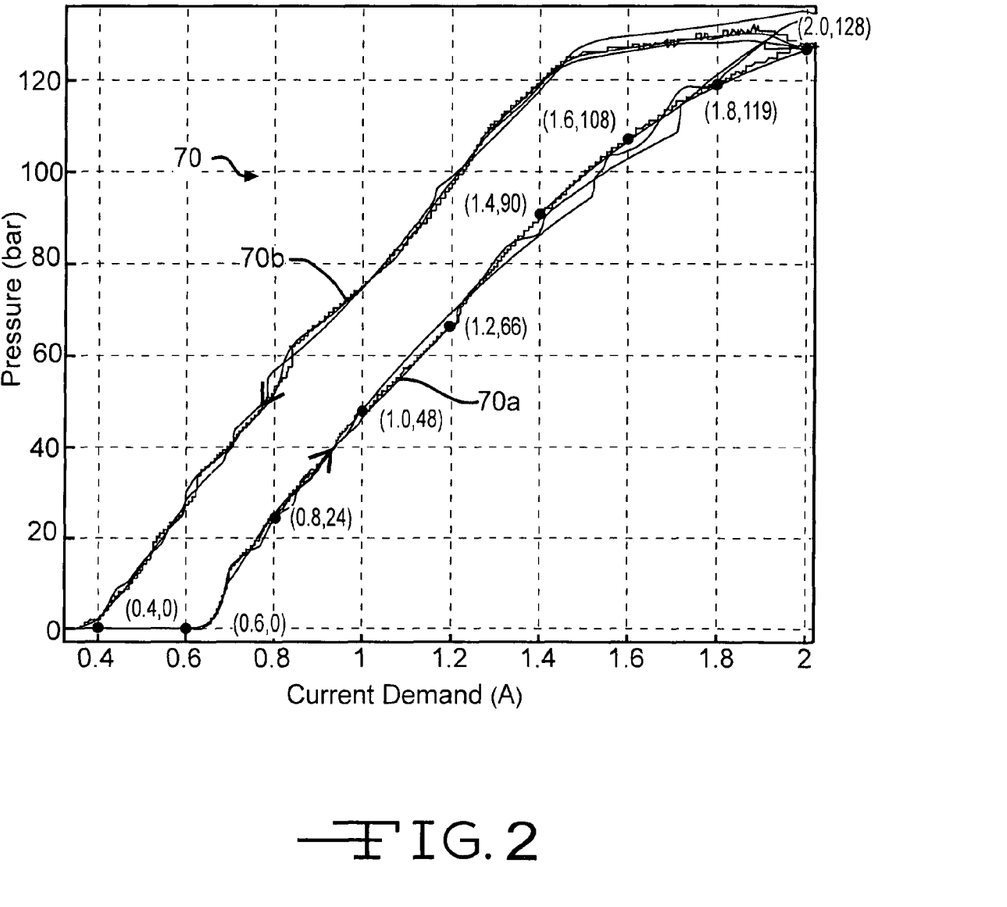
FIG. 2 is a graphical plot of current demand versus pressure from a minimum signal, through a maximum signal and back down to a minimum signal, and the resultant hysterisis curve for a typical spool valve.

FIG. 2 is an illustration of repeated apply and release operations of a typical example of the three-way spool valve 18. Each complete apply and release operation describes a single operating curve 70 (and there are several overlapping operating curves 70 illustrated) on a graph of the current demand, required to: 1) move the spool valve 18 to the apply port just closed position at a given at the load port 18b (which is plotted along a first portion 70a of the operating curve 70, or 2) move the spool valve 18 to the release port just closed position at a given pressure at the load port 18b (which is plotted along a second portion 70b of the operating curve 70). The positive slope of the portion 70a of the operating curve 70 indicates an increasing current command signal. The measure of the slope of the current command signal is the rate of change of current command. The opposite is also true. If the rate of change in current command is negative, that is, if the current command signal is decreasing (has a negative slope), then the release flow path through the spool valve 18 is active so that there can be a decrease in braking pressure.

Looking at the apply portion 70a, coordinate pairs can be plotted to develop the apply lookup table 46 of the current command signal required to move the spool of the spool valve 18 to the apply just closed position at various pressures. Similar coordinate pairs can be plotted on the release portion 70b to develop the release lookup table 70b. Note that a formula may be substituted for a lookup table, as is well known in the control art. For example, a formula (in the form of y=mx+b) which might be used to approximate the exemplary coordinates plotted on the apply portion 70a of FIG. 2 is y=83.1x−33.1. Therefore, as used in this application, the terms lookup table and boundary table, should be interpreted to include the use of a formula function instead of a lookup table (boundary table).

The first boundary table 46 supplies the signal values to be used when a signal is applied to the move the three-way spool valve 18 to the apply port just closed position for a range of wheel brake pressures. Similarly, the second boundary table 48 supplies the values respective to the positioning the spool valve 18 to the release port just closed position for a range of wheel brake pressures $P_w$. The signal values for the boundary tables 46, 48 account for pre-load forces from a spring connected to the valve armature and the pressure feedback force across the valve 18. The signal values for the boundary tables 46, 48 will be determined based on experimentation, the natural characteristics of a particular valve and the operating conditions. Since each valve in actual use will have different natural characteristics due to manufacturing, installation and other factors, the table signal values will need to be updated based on those natural characteristics.

The table signal values are updated based on system response to the pressure command signal as described below. The amount the table signal values are updated is estimated based on the modified error between the pressure command signal and the actual pressure realized by activation of the valve. The amount of the modified pressure error, $e_m$, is determined from information within the pressure controller 54. One of the estimators 50, 52 will act to compensate for the modified pressure error. The output of the estimator 50, 52 then updates the table signal values by increasing or decreasing the table signal values. Only one estimator 50, 52 should be updated at a time.

According to one method of practicing the invention, which will be further discussed below, the estimators 50, 52 are updated during actual use of the braking system 12. When the operator of the vehicle in which the brake system 12 is installed operates the brakes, or releases the brakes, this provides an opportunity to update an estimator 50, 52. There are several conditions that can be used to determine whether an estimator 50, 52 should be updated. The decision of which estimator 50, 52 to update is based on the polarity of the brake pressure derivative over time ($\dot{P}_{cmd}$, the rate of change of $P_{cmd}$); that is, to enable the apply estimator if the brake pressure derivative over time is greater than zero ($\dot{P}_{cmd} > 0$) and to enable the release estimator if the brake pressure derivative over time, is less than zero ($\dot{P}_{cmd} < 0$). However, there are several drawbacks to using this condition to determine whether to update the estimators. Measurements of brake pressure are generally noisy and also prone to disturbances, especially in a closed-loop system. This allows small variations due to noise to cause the estimators to update. Second, if one of the boundary curves over-compensates the deadband, oscillations in the brake pressure due to the aggressive boundary setting would provide false information on the other boundary of the wheel. This can be seen in FIG. 3.

Figure 3:
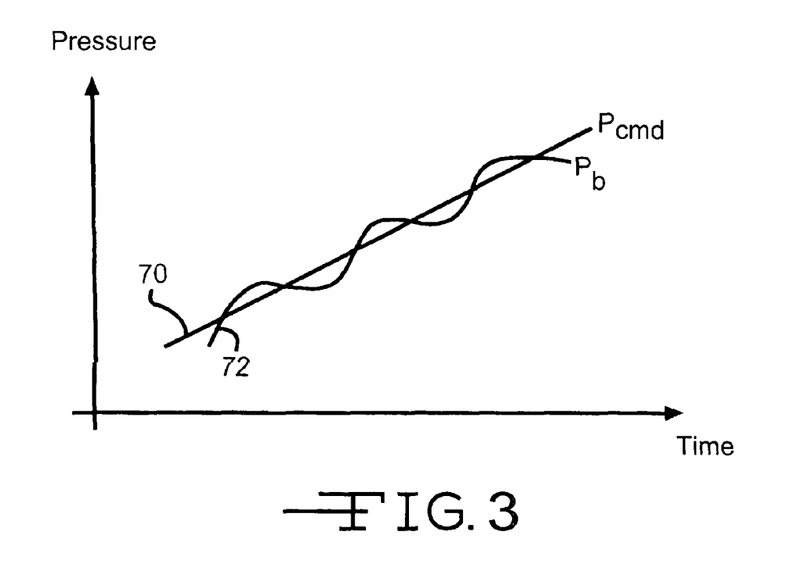
FIG. 3 is a graphical plot of pressure versus time, showing a constantly increasing pressure command and a possible resulting variation of brake pressure

In FIG. 3, a plot of pressure versus time is given, with a curve 71 which is the plot of a pressure command signal $P_{cmd}$ with a constant rise rate. A curve 72 is shown which represents the brake pressure $P_b$ resulting from an aggressive or over-compensated response of the apply function of the spool valve 18. The oscillations above and below the curve 71 demonstrate an overly aggressive apply boundary setting, so that initially, brake pressure is $P_b$ applied more rapidly than is commanded. Therefore, while only the apply function of the spool valve 18 is supposed to be active to accommodate the rising pressure command signal, when the braking pressure curve 72 overshoots the curve 71 and the wheel brake pressure $P_w$ is higher than has actually been commanded, the release valve function of the spool valve 18 would be active. This would cause table signal values for both estimators 50, 52 to update when only the apply estimator 50 should be updated. Finally, it is hard to distinguish between transients and a steady state with an aggressive boundary curve.

As is noted below, it is possible to utilizes valving arrangements other than the three-way spool valve 18; for example by utilizing two two-way spool valves (not shown) with one acting as an apply valve and associated with the apply estimator 50, and the other acting as a release valve and associated with the release estimator 52. However, in such an arrangement, a second condition under which one estimator 50, 52 should be updated is based on whether the corresponding apply or release valve is commanded to be active. This results in essentially the same result as the first condition, described above. Oscillations due to one aggressive boundary curve provide false information on the other boundary of the wheel. The curves shown in FIG. 3 again represent this condition.

In the present invention, the polarity of the pressure command derivative over time is used to determine whether to update the apply estimator 50 or the release estimator 52. That is, to enable updating of the apply estimator 50 if the pressure command derivative over time is greater than zero ($\dot{P}_{cmd}>0$) and enable updating of the release estimator 52 if the pressure command derivative over time is less than zero ($\dot{P}_{cmd}<0$), regardless of the actual state of the spool valve 18. This strategy is the most effective because the three-way spool valve 18 is supposed to be active in the apply mode whenever brake pressure buildup is requested ($\dot{P}_{cmd}>0$) and be active in the release mode whenever brake pressure reduction is requested ($\dot{P}_{cmd}<0$). If the rate of change in pressure command is positive, then the apply mode is active so that there can be an increase in braking pressure.

Figure 4:
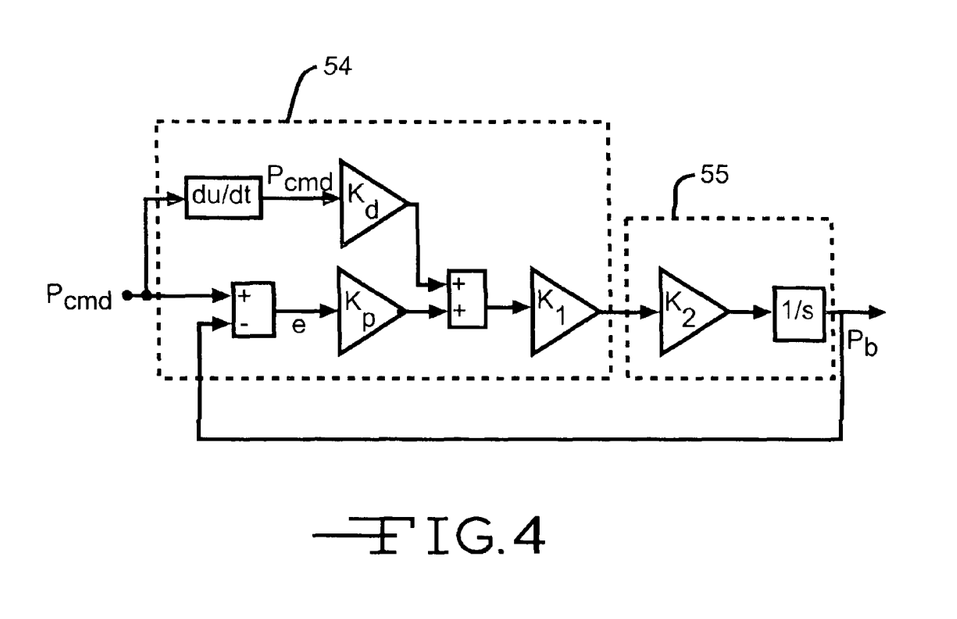
FIG. 4 is a simplified schematic diagram representing a simplified closed-loop pressure control system which may be utilized with the method of the invention.

For the purpose of the present invention, an integral element is included in the preferred algorithm used to estimate boundary deviation from the nominal boundary. However, pressure error between the pressure command and wheel brake pressure is not used directly in the estimators, as is the case with the invention disclosed in U.S. Pat. No. 6,030,055 to Schubert. Instead, a modified pressure error is used such that pressure error resulting from other factors, including a mismatched feedforward term and a control deadzone, is excluded. Because integration is part of the respective estimators 50, 52, the boundary estimate will converge to a point where the modified pressure error is zero but pressure error is not zero. The difference between pressure error and modified pressure error is a function of the pressure command derivative over time, control deadzone and any other factors. The use of modified pressure error in the estimator helps achieve a consistent boundary estimate and therefore consistent pressure control performance for different types of pressure commands. FIG. 4 exemplifies a method of calculating modified pressure error. The process is illustrated in a simplified closed-loop pressure control system with perfect boundary match. As seen in FIG. 4, the pressure control system includes the pressure controller 54, and a derivative feedforward controller 55.

In FIG. 4, $P_{cmd}$ and $P_b$ represent the pressure commanded by the braking system 12 and the brake pressure actually realized by the braking system 12, respectively. The simplified physical system, with voltage as its input and wheel brake pressure as its output, consists of gain factor $K_2$ and integral element "1/s". The gain factor $K_2$ represents lump-sum physical gain from the voltage to the wheel brake pressure $P_b$, and the integral element "1/s" denotes the dominating dynamic relationship for the simplified system. The simplified controller, with pressure command $P_{cmd}$ and wheel brake pressure $P_b$ as inputs and voltage as output, is composed of a proportional feedback control and a derivative feedforward control. The proportional gain for the proportional feedback control, $K_p$, acts on the pressure error e between the pressure command $P_{cmd}$ and the wheel brake pressure $P_b$. The derivative gain for the derivative feedforward control, $K_d$, acts on the pressure command derivative over time. Finally gain factor $K_1$, which acts on the sum of the proportional feedback control output and the derivative feedforward control output, should be set to $K_2^{-1}$. When $\dot{P}_{cmd}$ has a constant ramp rate, the steady state pressure error, $e_{SS}$, is represented by the following equation:

$$e_{ss} = \frac{(K_1 K_2)^{-1} - K_d}{K_p} \dot{P}_{cmd} \quad (1)$$

where $e_{SS}$ is steady state pressure error;
$K_1$ is a first gain factor;
$K_2$ is a second gain factor
$K_d$ is derivative gain for derivative feed forward control;
$K_p$ is proportional gain for proportional feed back control; and
$\dot{P}_{cmd}$ is pressure command derivative (rate of change in pressure commanded by the braking system, $P_{cmd}$).

In the case where $K_1 K_2=1$, which represents that there is perfect gain match, the modified steady state error can be made equal to zero by subtracting the following steady state pressure error, $e_{SS}$, from pressure error e:

$$e_{ss} = \left(\frac{1 - K_d}{K_p}\right) \dot{P}_{cmd} \quad (2)$$

where $e_{SS}$ is steady state pressure error;
$K_d$ is derivative gain for derivative feed forward control;
$K_p$ is proportional gain for proportional feed back control; and
$\dot{P}_{cmd}$ is pressure command derivative.

Therefore, the modified pressure error $e_m$ is as follows:

$$e_m = \frac{Q_{dem} - \dot{P}_{cmd}}{K_p} \quad (3)$$

where $e_m$ is modified pressure error;
$Q_{dem}$ is demanded fluid flow to or from the wheel brake;
$\dot{P}_{cmd}$ is pressure command derivative; and
$K_p$ is proportional gain for proportional feed back control.
In the equation above, $Q_{dem}=K_p e + K_d \dot{P}_{cmd}$.

Control deadzone can be defined that range of values of a control signal which results in no change in the controlled system. In the system illustrated in FIG. 1, there are a range of voltages which can be applied to the spool valve 18 which causes the spool of the valve 18 to be positioned somewhere ranging from the apply just-closed position and the release just-closed position, with the wheel brake 22 remaining isolated (no flow to or from the wheel brake 22). If we label the upper end of that range of voltages as +switch and the lower end of that range of voltages as −switch, then it will be appreciated that both the apply and the release flow paths through the valve 18 remain closed when $Q_{dem} \in (-switch,$ +switch), and while this is true, the modified pressure error, $e_m$, is as follows:

$$e_m = \begin{cases} \min\left\{\dfrac{Q_{dem} - \text{switch}}{K_p}, \dfrac{Q_{dem} - \dot{P}_{cmd}}{K_p}\right\} \\ \max\left\{\dfrac{Q_{dem} + \text{switch}}{K_p}, \dfrac{Q_{dem} - \dot{P}_{cmd}}{K_p}\right\} \end{cases} \quad (4)$$

where $e_m$ is modified pressure error;
$Q_{dem}$ is demanded fluid flow to or from the wheel brake;
$\dot{P}_{cmd}$ is pressure command derivative; and
$K_p$ is proportional gain for proportional feed back control.

The first (upper) part of equation (4), above, represents the modified pressure error for the apply estimator. The second (lower) part of equation (4) is for the release estimator. The first term in the min/max function, described above, is used to accommodate the control deadzone, such that integral wind-up would not result. It should be noted that the formula introduced in the example is not meant to limit the way that modified pressure error can be calculated, and the block diagram shown in FIG. 4 is not meant to restrict the scope of closed-loop pressure control strategy.

In practice, it is not practical to assume that $K_1$ $K_2=1$ over the whole pressure range of valve operations. If there is a mismatch in the gain, the mismatch can be viewed as a boundary deviation from the perspective of the estimators 50, 52. Additionally, these perceived boundary variations will be proportional to the rate of change of $P_{cmd}$ ($\dot{P}_{cmd}$). To minimize the effect of these perceived boundary variations the estimators 50, 52 are updated only at low absolute values of $\dot{P}_{cmd}$, ($|\dot{P}_{cmd}|$).

If the estimators 50, 52 are updated during operation of the braking system, as will be described according to one embodiment of the invention below, then the estimators 50, 52 are updated only during gentle braking maneuvers. Gentle braking can be considered any braking where the absolute value of the pressure command derivative, $|\dot{P}_{cmd}|$, is less than the maximum allowable rate of change for wheel brake pressure, for a given valve in an EHB braking system 12. At values of $|\dot{P}_{cmd}|$ that are less than a pre-specified amount, the estimators 50, 52 would be updated. A pre-specified amount could be any value that is less than the maximum pressure command derivative, $\dot{P}_{cmd}$, for a given valve. The pre-specified value of $|\dot{P}_{cmd}|$ could be fixed across the entire operating pressure range or can vary with pressure conditions. The pressure conditions that vary include the wheel brake pressure and the pressure differentials across a valve 18 or 26. By updating the estimators only at low $|\dot{P}_{cmd}|$ values, integration will result in much more accurate values.

If, on the other hand, the estimators 50, 52 are being updated by introduction of a pressure command $P_{cmd}$ signal from calibration equipment, according to the other embodiments of the invention described below, then the calibration equipment should be set up to change $P_{cmd}$ at low rates, less than a pre-determined maximum pressure command derivative $\dot{P}_{cmd}$. The pre-specified value of $|\dot{P}_{cmd}|$ could be fixed across the entire operating pressure range or can vary with pressure conditions. By updating the estimators only at low $|\dot{P}_{cmd}|$ values, integration will result in much more accurate values.

An additional reason for updating the estimators only at low $|\dot{P}_{cmd}|$ values is that, due to the physical dimensions of valve openings, there is a limit on the amount of fluid that can flow through an active spool valve 18. As a result, if there is a large absolute value of $P_{cmd}$ the active spool valve 18 may not be able to allow flow through the spool valve 18 at a rate that matches the demanded flow. As a result, the boundary adjustment will not be as accurate as when the updates take place during a lower flow demand event.

It may be desirable in some applications to provide gain scheduling in the estimators 50, 52 to deal with asymmetry in mapping from boundary deviation to modified pressure error. Pressure related variations can be handled by using a well-given nominal boundary to reduce the amplitude and frequency of the deviations. Normally, deviations from the nominal boundary will vary over the entire pressure range. In one embodiment, the entire boundary region is partitioned into many segments with one state variable assigned with each segment. The result of the estimation is stored in the state variable associated with the current segment. The values of state variables can be either directly used in computing control commands, or used in linear interpolation to avoid discontinuity between adjacent segments.

Figure 5:
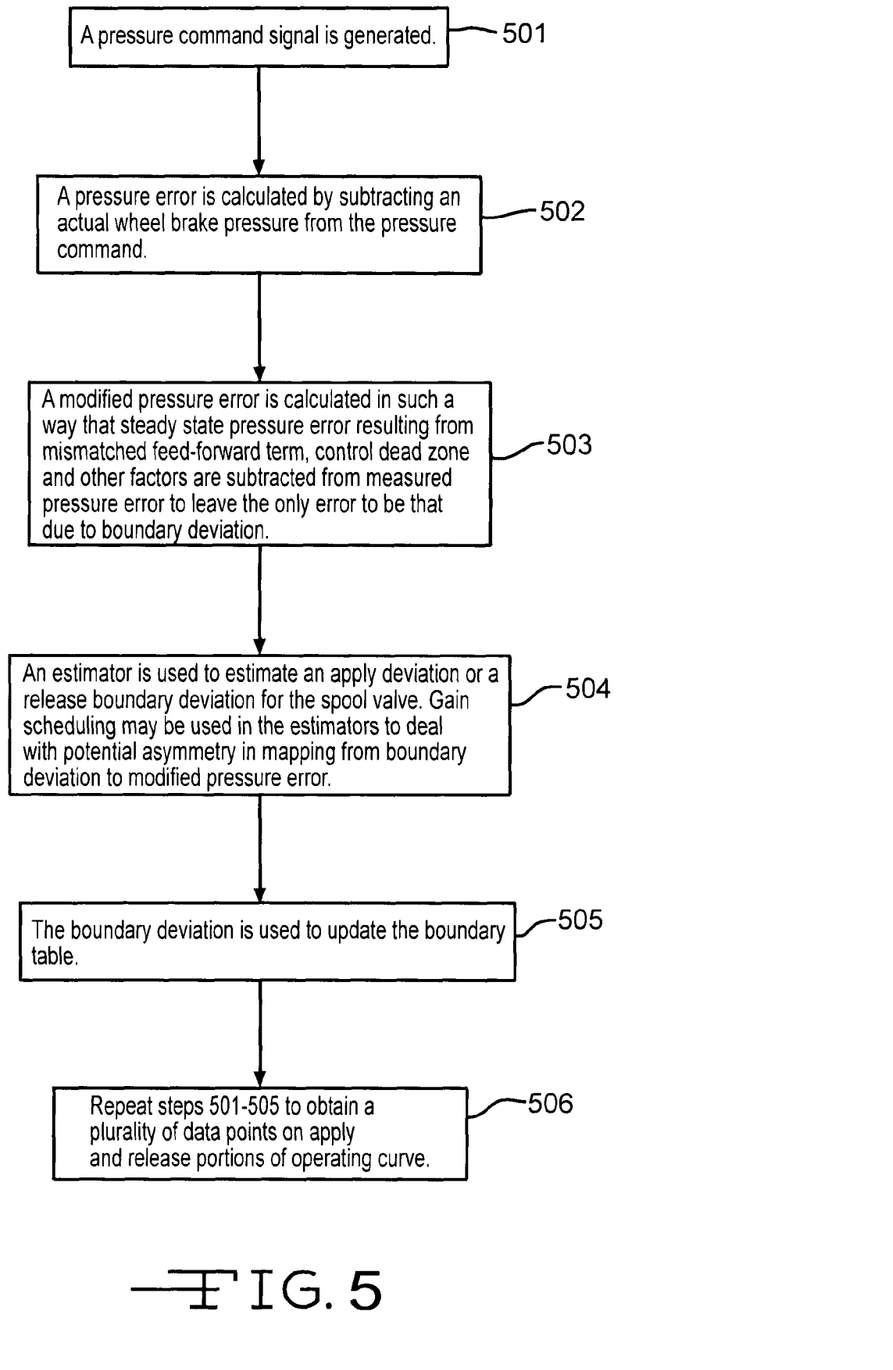
FIG. 5 shows a block diagram representing the steps of the present invention according to a first embodiment

Referring now to FIG. 5, the preferred boundary adaptation scheme is described, in which the boundary estimators 50, 52 are preferably updated during a dedicated calibration operation (which may be performed, for example, during initial installation of the braking system 12, or during periodic maintenance operations during the operating life of the braking system 12, or on an as-needed basis as part of a repair procedure). The illustrated method may be practiced as follows: (1) In a first step, 501, a pressure command signal is generated and fed to the pressure controller 54 (seen in FIG. 1) to move the spool valve 18 to the apply just-closed position (or, as appropriate, the release just-closed position) with a specified pressure at the spool valve 18. (2) In a second step 502, a pressure error is calculated by subtracting an actual wheel brake pressure (which may suitably be obtained from the wheel brake pressure sensor 30, or from test equipment installed for the procedure) from the pressure command. (3) In a third step 503, a modified pressure error is calculated in such a way that steady state pressure error resulting from mismatched feedforward term, control deadzone and other factors are subtracted from measured pressure error to leave the only error to be that due to boundary deviation. (4) In a fourth step, 504, the estimator 50 or 52 is used to estimate an apply boundary deviation or a release boundary deviation, respectively, of the three-way spool valve 18, depending on whether a rising pressure command $P_{cmd}$ or a falling pressure command $P_{cmd}$, respectively, is being generated. Gain scheduling may used in the estimators 50, 52 to deal with potential asymmetry in mapping from boundary deviation to modified pressure error. (5) In an fifth step 505, the estimated apply boundary deviation or estimated release boundary deviation derived in the fifth step 505 is used to update, respectively, the apply boundary table 46 or the release boundary table 48. Finally, (6) In a sixth step 506, the steps 501 through 505 are repeated as required to obtain a substantial number of data points throughout the apply portion 70a and the release portion 70b of the operating curve 70. Preferably, the two end data points and at least one, but preferably more, intermediate data points are obtained for each of the apply portion 70a and the release portion 70b. Additionally, the whole pressure region can be partitioned into segments with one state variable associated with each segment, and the values of state variables are in turn used directly or indirectly in computing control command at corresponding segments. The above listed steps have been identified as occurring in a specific order, however, it should be understood that these steps can be accomplished in any suitable order without departing from the spirit or scope of the present invention.

Figure 6:
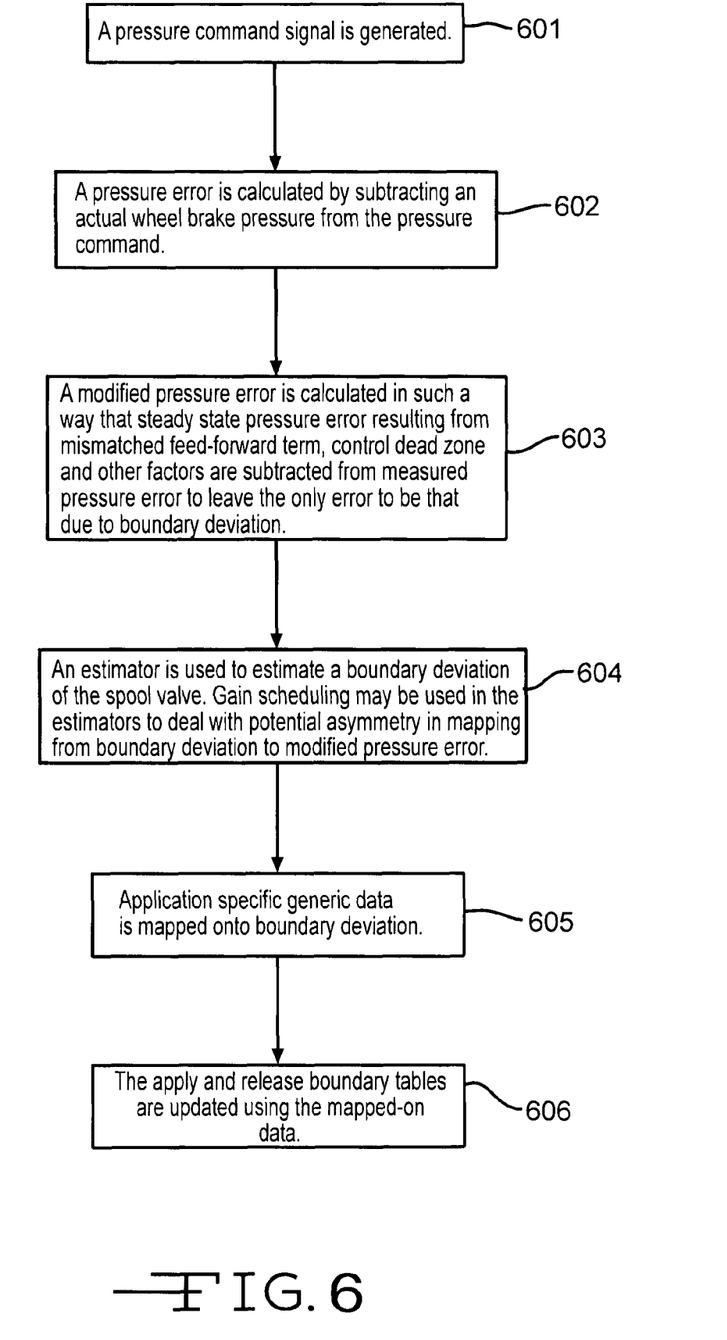
FIG. 6 shows a block diagram representing the steps of the present invention according to a second embodiment.

Referring now to FIG. 6, an alternate embodiment of a boundary adaptation scheme is described, in which the boundary estimators 50, 52 are updated in a somewhat similar manner to the method disclosed in FIG. 5, in that the updating is preferably performed during a dedicated calibration operation (which may be performed, for example, during initial installation of the braking system 12, or during periodic maintenance operations during the operating life of the braking system 12, or on an as-needed basis as part of a repair procedure). The illustrated method may be practiced as follows: (1) In a first step, 601a pressure command signal $P_{cmd}$ is generated and fed to the pressure controller 54 (seen in FIG. 1) to move the spool valve 18 to the apply just-closed position (or, alternatively, the release just-closed position) with a specified pressure at the spool valve 18. Suitably, the pressure command signal $P_{cmd}$ is generated to move the spool valve 18 to the apply just-closed position with a maximum operating pressure at the three-way spool valve 18, corresponding to the upper right end point of the apply portion 70a of the operating curve 70 (shown in FIG. 2). (2) In a second step 602, a pressure error is calculated by subtracting an actual wheel brake pressure (which may suitably be obtained from the wheel brake pressure sensor 30, or from test equipment installed for the procedure) from the pressure command. (3) In a third step 603, a modified pressure error is calculated in such a way that steady state pressure error resulting from mismatched feedforward term, control deadzone and other factors are subtracted from measured pressure error to leave the only error to be that due to boundary deviation. (4) In a fourth step, 604, the apply estimator 50 is used to estimate an apply boundary deviation, of the three-way spool valve 18. Gain scheduling may be used in the apply estimator 50 to deal with potential asymmetry in mapping from boundary deviation to modified pressure error. (5) In an fifth step 605, an "application specific generic data" is fitted to the apply boundary deviation derived in the fifth step 605. "Application specific generic data" means a set of data that is derived by testing a number of spool valves of the same design in systems 12 that are the same as the system in which the subject three-way spool valve 18 is being installed, and averaging the corresponding data points over all of the valid test subjects. Any suitable testing methodology may be used to obtain the application specific generic data, including the method described in association with FIG. 5. Thus the result is generic (representative of the average valve) and application specific (the same type system installation). Once the single test result (apply boundary deviation) is obtained in steps 601 through 605 for a specific three-way spool valve 18 installed in a specific system 12, then, according to this embodiment, it is assumed that shape of the operating curve 70 of the generic spool valve of the same design in the same design system 12 will not be substantially different from the shape of the specific operating curve 70 of the subject three-way spool valve 18 being tested. Therefore, one need only shift the application specific generic data a little to map it onto the estimated apply boundary deviation obtained in steps 601 to 605, i.e., adjust the generic operating curve 70 to overlay at the one data point of step 601 for the subject three-way spool valve 18. (6) In a sixth step 606, the data which has been mapped onto the apply boundary deviation is used to update the apply boundary table 46 and the release boundary table 48. The above listed steps have been identified as occurring in a specific order, however, it should be understood that these steps can be accomplished in any suitable order without departing from the spirit or scope of the present invention.

Figure 7:
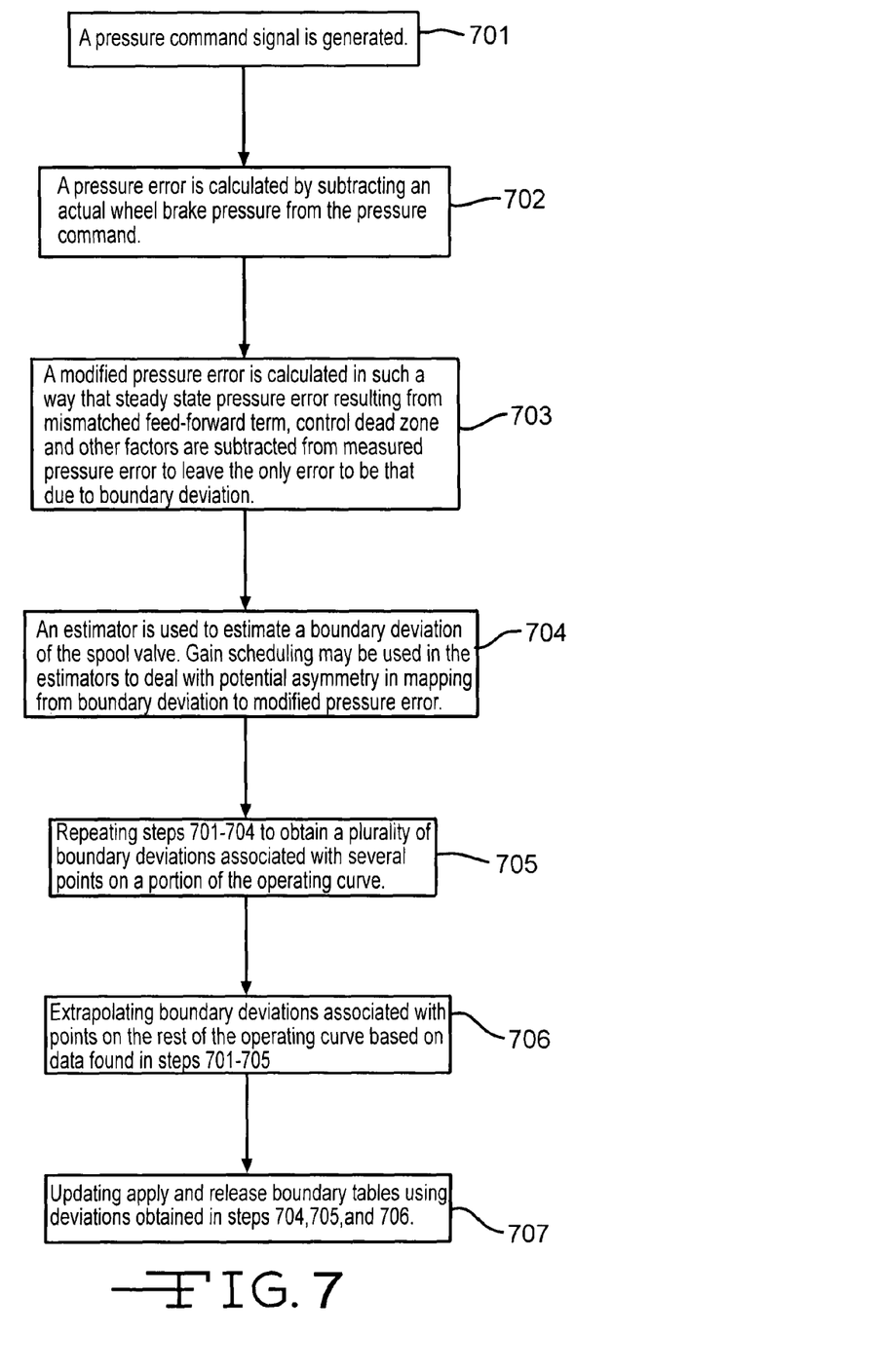
FIG. 7 shows a block diagram representing the steps of the present invention according to a third embodiment.

Referring now to FIG. 7, an alternate embodiment of a boundary adaptation scheme is described, in which the boundary estimators 50, 52 are updated in a somewhat similar manner to the method disclosed in FIGS. 5 and 6, in that the updating is preferably performed during a dedicated calibration operation (which may be performed, for example, during initial installation of the braking system 12, or during periodic maintenance operations during the operating life of the braking system 12, or on an as-needed basis as part of a repair procedure). The illustrated method may be practiced as follows: (1) In a first step, 701a pressure command signal $P_{cmd}$ is generated and fed to the pressure controller 54 (seen in FIG. 1) to move the spool valve 18 to the apply just-closed position (or, alternatively, the release just-closed position) with a specified pressure at the spool valve 18. Suitably, the pressure command signal $P_{cmd}$ is generated to move the spool valve 18 to the apply just-closed position with a maximum operating pressure at the three-way spool valve 18, corresponding to the upper right end point of the apply portion 70a of the operating curve 70 (shown in FIG. 2). (2) In a second step 702, a pressure error is calculated by subtracting an actual wheel brake pressure (which may suitably be obtained from the wheel brake pressure sensor 30, or from test equipment installed for the procedure) from the pressure command. (3) In a third step 703, a modified pressure error is calculated in such a way that steady state pressure error resulting from mismatched feedforward term, control deadzone and other factors are subtracted from measured pressure error to leave the only error to be that due to boundary deviation. (4) In a fourth step 704, the apply estimator 50 is used to estimate an apply boundary deviation, of the three-way spool valve 18. Gain scheduling may used in the apply estimator 50 to deal with potential asymmetry in mapping from boundary deviation to modified pressure error. (5) In a fifth step 705, the steps 701 through 704 are repeated for a plurality of different pressure command signals, to obtain boundary deviations associated with several points along a portion or portions of the operating curve 70. (6) In a sixth step 706, now that boundary deviations for a portion of the curve is obtained, boundary deviations for the full range of pressure can be mathematically extrapolated. (7) In a seventh step 707, the apply boundary table 46 and the release boundary table 48 are updated utilizing both the measured boundary deviations and the extrapolated boundary deviations. The above listed steps have been identified as occurring in a specific order, however, it should be understood that these steps can be accomplished in any suitable order without departing from the spirit or scope of the present invention.

Figure 8A:
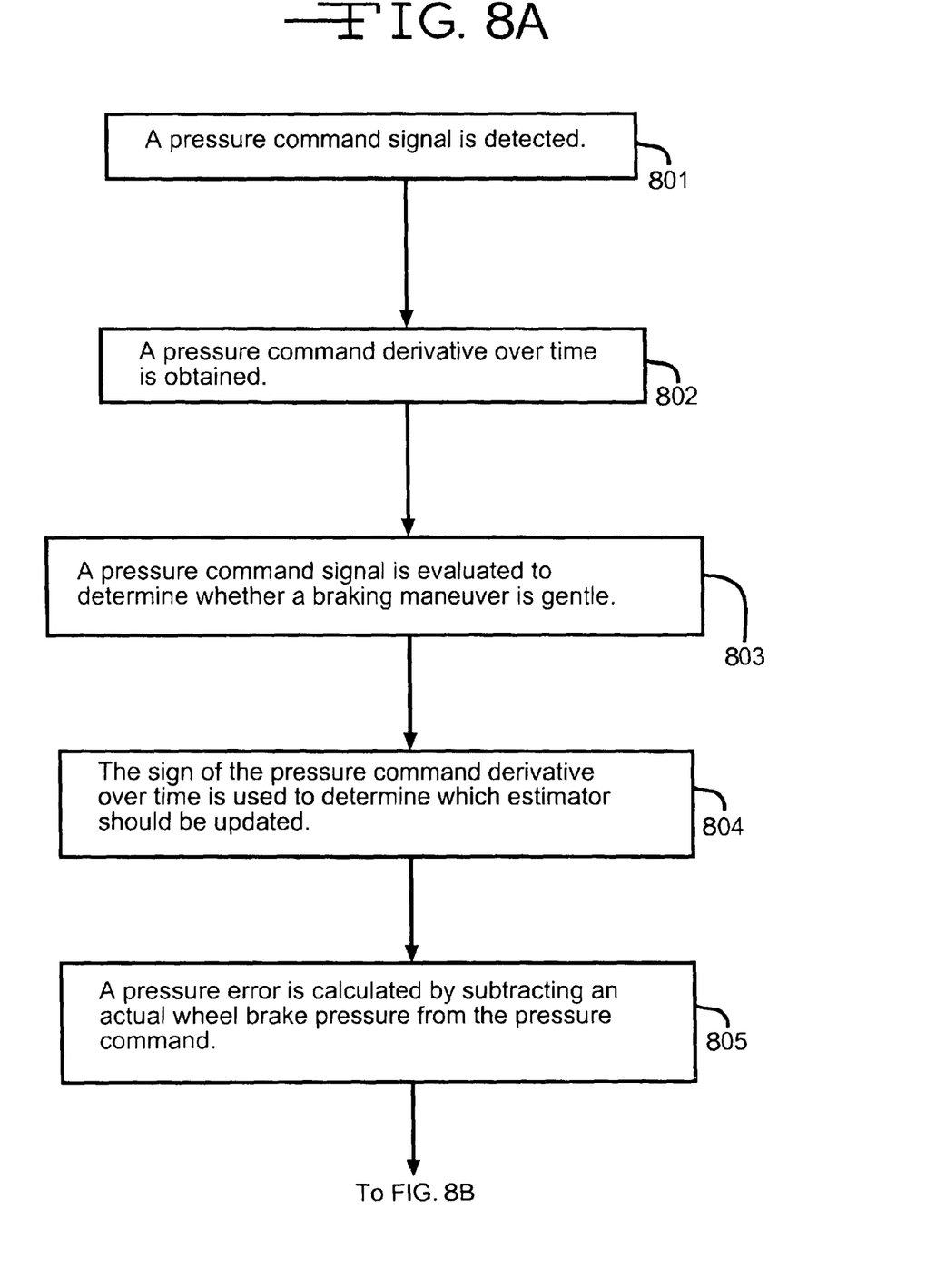
FIGS. 8A and 8B show a block diagram representing the steps of the present invention according to a third embodiment.
Figure 8B:
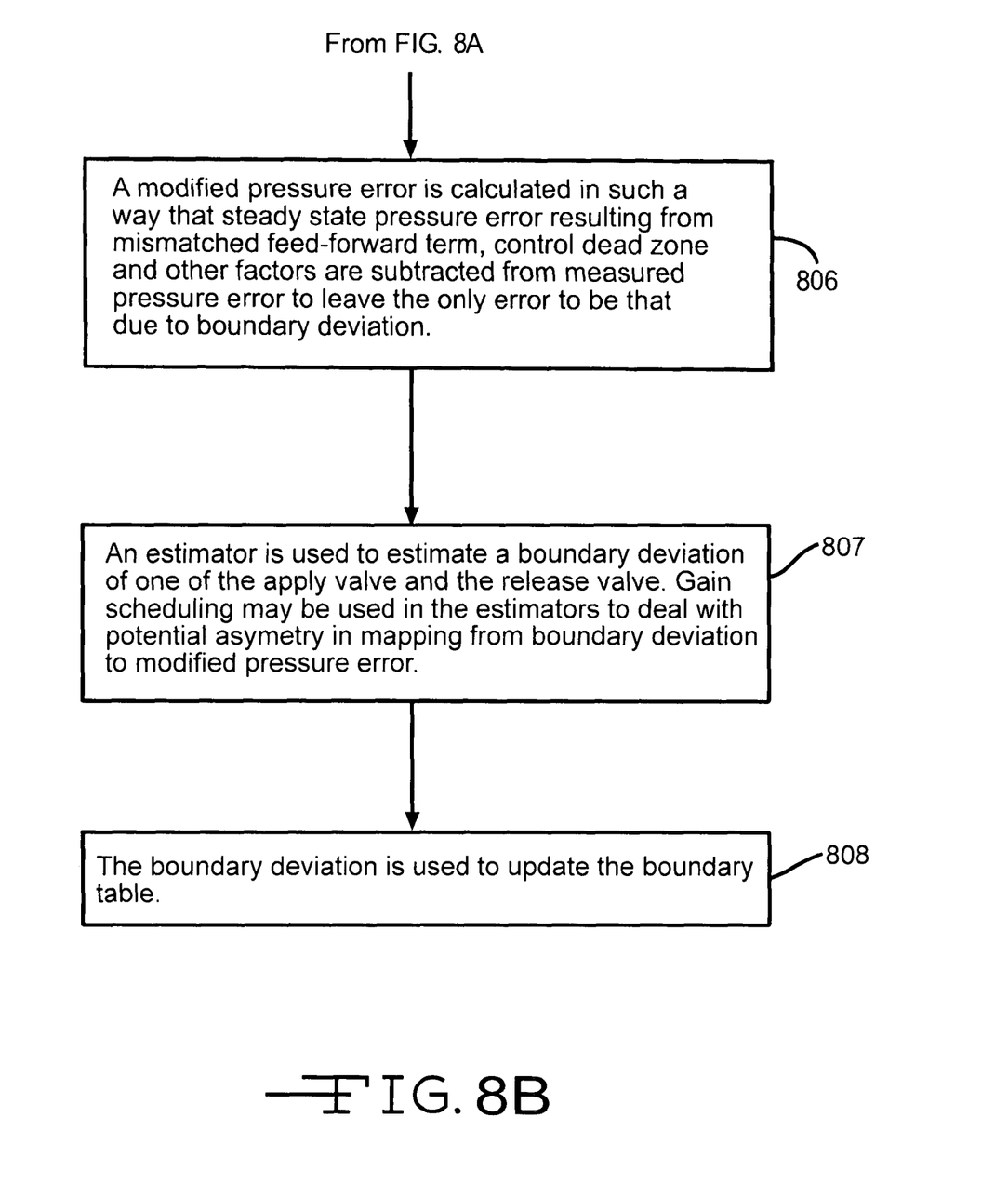

As shown in FIGS. 8A and 8B, a proposed boundary self-adaptation scheme in an alternate embodiment in which the boundary estimators 50, 52 are updated during operation of the braking system 12 may be practiced as follows: (1) In a first step, 801, a pressure command signal $P_{cmd}$ is detected. (2) In a second step 802, a pressure command derivative $\dot{P}_{cmd}$ over time is obtained. (3) In a third step 803, the pressure command derivative over time $\dot{P}_{cmd}$ is preferably evaluated to determine whether a braking maneuver is gentle, (4) In a fourth step 804, the sign of the pressure command derivative over time $\dot{P}_{cmd}$ is used to determine which estimator 50 or 52 should be updated, that is, the apply estimator 50 should be updated and the release estimator 52 should not when the pressure command derivative over time $\dot{P}_{cmd}$ is positive and vice versa. (5) In a fifth step 805, a pressure error is calculated by subtracting an actual wheel brake pressure from the pressure command. $P_{cmd}$ (6) In a sixth step 806, a modified pressure error is calculated in such a way that steady state pressure error resulting from mismatched feedforward term, control deadzone and other factors are subtracted from measured pressure error to leave the only error to be that due to boundary deviation. (7) In a seventh step, 807, an estimator 50 or 52 is used to estimate a boundary deviation of one of the apply path and the release path of the three-way spool valve 18. Gain scheduling may be used in the estimators 50, 52 to deal with potential asymmetry in mapping from boundary deviation to modified pressure error. (8) In a eighth step 808, the boundary deviation is used to update the boundary table 46 or 48. As in the earlier embodiments, the whole pressure region can be partitioned into segments with one state variable associated with each segment, and the values of state variables are in turn used directly or indirectly in computing control command at corresponding segments. The above listed steps have been identified as occurring in a specific order, however, it should be understood that these steps can be accomplished in any order without departing from the spirit or scope of the present invention.

The preferred embodiment has been described as using voltage controls. In that voltage is proportional to current, it is understood that the use of current controls is also within the scope of the claims of the present invention. Also, as a reminder of what was mentioned above, while this invention is described in the context of the control of hydraulic loads in the form of vehicle wheel brakes, the invention can be applied to hydraulic or pneumatic systems other than vehicle braking systems, and the scope of the claims should be thus correspondingly broadly interpreted. Furthermore, as used in this disclosure, the term "three-way spool valve" should be interpreted as a spool valve or combination of valves including at least one spool valve which can be arranged and controlled to perform at least the function of a three-way spool valve.

The principle and mode of operation of this invention have been explained and illustrated in its preferred embodiment. However, it must be understood that this invention may be practiced otherwise than as specifically explained and illustrated without departing from its spirit or scope. For instance, it can be applied with minor modifications to estimate the characteristic curves described in U.S. Pat. No. 6,086,167 to Heckmann, et al.

What is claimed is:

1. A method for adapting a closing boundary for a proportional spool valve comprising: (a) generating a pressure command signal; (b) obtaining a pressure error by subtracting an actual brake pressure from its pressure command; (c) calculating a modified pressure error; (d) using an estimator to estimate an apply boundary deviation or a release boundary deviation of the spool valve, as appropriate; and (e) updating a boundary table using the resultant boundary deviation estimate.

2. The method of claim 1, wherein the boundary table is one of two tables including an apply boundary table and a release boundary table, the method further including after step (e), the step (f) repeating steps (a) through (e) while generating different pressure command signals for each step (a) so as to obtain boundary deviation estimates to update both the apply boundary table and the release boundary table for a plurality of data points on the apply and release portions, respectively, of an operating curve of the spool valve.

3. The method defined in claim 2 wherein the modified pressure error for an apply boundary of the valve has alternating signs that result from an over-compensated deadband and wherein the modified pressure errors with alternating signs give a negative boundary deviation estimate.

4. The method defined in claim 3 wherein the modified pressure error for a release boundary of the valve has alternating signs that result from an over-compensated deadband and wherein the modified pressure errors with alternating signs give a positive boundary deviation estimate.

5. The method defined in claim 2 wherein, in step (d), a gain scheduler is used for the estimator.

6. The method of claim 1 further including, following step (e), the following steps: (f) repeating steps (a) through (e) while generating different pressure command signals in step (a) to obtain boundary deviations associated with several points on a portion of the operating curve; (g) extrapolating boundary deviations associated with points on the rest of the operating curve based on the data obtained in steps (a) through (f); and (h) updating apply and release boundary tables using the boundary deviations obtained in steps (e) and (f) and extrapolated in step (g).

7. The method defined in claim 6 wherein the modified pressure error for an apply boundary of the valve has alternating signs that result from an over-compensated deadband and wherein the modified pressure errors with alternating signs give a negative boundary deviation estimate.

8. The method defined in claim 6 wherein the modified pressure error for a release boundary of the valve has alternating signs that result from an over-compensated deadband and wherein the modified pressure errors with alternating signs give a positive boundary deviation estimate.

9. The method defined in claim 6 wherein, in step (d), a gain scheduler is used for the estimator.

10. The method defined in claim 1 wherein a first estimator and a second estimator are used to estimate boundary deviations of apply and release functions, respectively, of a valve.

11. The method defined in claim 10 wherein the sign of the pressure command derivative over time is used to determine whether the first estimator or the second estimator is updated.

12. The method of claim 1 Further including following step (e) the following two steps: (f) mapping application specific generic data onto the boundary deviation determined in step (e); and (g) updating apply and release boundary tables using the mapped-on data.

13. The method defined in claim 1 wherein, in step (d), a gain scheduler is used for the estimator.

14. The method defined in claim 13 wherein the modified pressure error for an apply boundary of the valve has alternating signs that result from an over-compensated deadband and wherein the modified pressure errors with alternating signs give a negative boundary deviation estimate.

15. The method defined in claim 13 wherein the modified pressure error for a release boundary of the valve has alternating signs that result from an over-compensated deadband and wherein the modified pressure errors with alternating signs give a positive boundary deviation estimate.

16. A method for adapting a closing boundary for a proportional spool valve comprising: (a) detecting a pressure command signal; (b) obtaining a pressure command derivative over time; (c) using the sign of the pressure command derivative over time to determine which closing boundary should be updated; (d) obtaining a pressure error by subtracting an actual brake pressure from its pressure command; (e) calculating a modified pressure error; (f) implementing the modified pressure error in the estimation; (g) implementing an estimator to estimate a boundary deviation of the valve; and (h) updating a boundary table using the resultant boundary deviation estimate.

17. The method defined in claim 16 wherein a first estimator and a second estimator are used to estimate boundary deviations of apply and release functions, respectively, of a valve.

18. The method defined in claim 16 wherein a gain scheduler is used for the estimator and wherein the modified pressure error for an apply boundary of the valve has alternating signs that result from an over-compensated deadband and wherein the modified pressure errors with alternating signs give a negative boundary deviation estimate.

19. The method defined in claim 16 wherein a gain scheduler is used for the estimator and wherein the modified pressure error for a release boundary of the valve has alternating signs that result from an over-compensated deadband and wherein the modified pressure errors with alternating signs give a positive boundary deviation estimate.

20. The method defined in claim 17 wherein the sign of the pressure command derivative over time is used to determine whether the first or second estimator is updated.

21. The method defined in claim 16 wherein the estimators are updated only during gentle braking maneuvers and wherein gentle braking is braking where the absolute value of the pressure command derivative over time is less than a pre-specified value that further is less than the maximum allowable rate of change for wheel brake pressure for the valve.

22. The method defined in claim 21 wherein the pre-specified value is fixed across an entire operating pressure range for a braking system.

23. The method defined in claim 21 wherein the pre-specified value varies with pressure conditions.

24. The method defined in claim 23 wherein the pressure conditions comprise wheel brake pressure and pressure differential across the valve.

25. The method defined in claim 16 wherein a feedforward mismatch and a control deadzone are excluded from the pressure error.

* * * * *